United States Patent
Hemminki et al.

(10) Patent No.: US 10,436,934 B2
(45) Date of Patent: Oct. 8, 2019

(54) GENERATION OF ESTIMATION FOR EARTH'S GRAVITY FOR USE IN MEASURING MOTION OF AN OBJECT

(71) Applicant: HELSINGIN YLIOPISTO, Helsingin Yliopisto (FI)

(72) Inventors: Samuli Hemminki, Helsingin Yliopisto (FI); Petteri Nurmi, Helsingin Yliopisto (FI); Sasu Tarkoma, Helsingin Yliopisto (FI)

(73) Assignee: HELSINGIN YLIOPISTO, Helsingin Yliopisto (FI)

( * ) Notice: Subject to any disclaimer, the term of this patent is extended or adjusted under 35 U.S.C. 154(b) by 320 days.

(21) Appl. No.: 15/324,883

(22) PCT Filed: Jun. 30, 2015

(86) PCT No.: PCT/FI2015/050478
§ 371 (c)(1),
(2) Date: Jan. 9, 2017

(87) PCT Pub. No.: WO2016/005657
PCT Pub. Date: Jan. 14, 2016

(65) Prior Publication Data
US 2017/0219735 A1    Aug. 3, 2017

(30) Foreign Application Priority Data
Jul. 8, 2014   (FI) .................................. 20145661

(51) Int. Cl.
*G01V 7/06*    (2006.01)
*G01C 21/16*   (2006.01)
(Continued)

(52) U.S. Cl.
CPC ............ *G01V 7/06* (2013.01); *G01C 21/16* (2013.01); *G01P 15/14* (2013.01); *G01P 15/00* (2013.01)

(58) Field of Classification Search
CPC ...... G01V 3/38; G01V 99/00; G01V 2210/74; G01V 99/005
See application file for complete search history.

(56) References Cited

U.S. PATENT DOCUMENTS

| | | | | |
|---|---|---|---|---|
| 4,550,601 A | * | 11/1985 | Evans ...................... | G01V 7/16 73/382 R |
| 2006/0184336 A1 | * | 8/2006 | Kolen ..................... | G01C 19/00 702/150 |

(Continued)

OTHER PUBLICATIONS

Hemminki, Samuli, et al.: "Accelerometer-based transportation mode detection on smartphones" In: "Proceedings of the 11th ACM Conference on Embedded Networked Sensor Systems", ACM New York, NY, USA. Article No. 13. Nov. 15, 2013.

(Continued)

*Primary Examiner* — Mischita L Henson
(74) *Attorney, Agent, or Firm* — Young & Thompson

(57) ABSTRACT

Disclosed is a method for generating an estimation of earth's gravity. The method includes: obtaining one or more acceleration data values and one or more orientation data values over a period of time; generating magnitude of orientation change from the orientation data values; determining a stability value based on the acceleration data values and the magnitude of orientation change; comparing the determined stability value to a threshold value; and generating an estimation of earth's gravity over the period of time on the basis of the acceleration data values if the comparison indicates that the determined stability value is below the threshold value. Also disclosed is an apparatus implementing the method.

19 Claims, 2 Drawing Sheets

(51) Int. Cl.
    *G01P 15/14*     (2013.01)
    *G01P 15/00*     (2006.01)

(56) References Cited

U.S. PATENT DOCUMENTS

| | | |
|---|---|---|
| 2012/0176492 A1 | 7/2012 | Garin |
| 2013/0106697 A1 | 5/2013 | Kulik |
| 2016/0091620 A1* | 3/2016 | Paros .................. G01V 1/18 73/1.39 |
| 2018/0292471 A1* | 10/2018 | Chen .................. G01R 33/072 |

OTHER PUBLICATIONS

Hemminki, Samuli.: "Continuous and energy-efficient transportation behaviour monitoring", Master's thesis. University of Helsinki. Nov. 19, 2012.

International Search Report, dated Oct. 20, 2015, from corresponding PCT Application.

Finnish Search Report, dated Mar. 4, 2015, from corresponding Finnish Application.

\* cited by examiner

GENERATION OF ESTIMATION FOR EARTH'S GRAVITY FOR USE IN MEASURING MOTION OF AN OBJECT

TECHNICAL FIELD

The invention concerns in general the technical field of measurement systems. Especially the invention concerns determination of earth's gravity.

BACKGROUND

Development of sensor techniques as well as utilization of those in varying contexts has enabled more sophisticated ways to obtain and generate information of objects. An important application area of sensors is monitoring of motion of an object, such as a mobile device. The monitoring provides information by means of which it is possible to derive multiple types of information, such as information on motion of a device.

The determination of motion information on devices is traditionally performed by utilizing positioning information from e.g. the Global Positioning System (GPS). The idea behind GPS-based systems is that by analyzing the change of position of the device some conclusions on motion can be achieved. However, GPS-based systems have many drawbacks. Firstly, the GPS receivers suffer from high power consumption, which is a problem with mobile devices. Secondly, the mobile device shall "see" a number of satellites in order to receive enough information for determining its position. This is not possible indoor and thus the determination of motion fails. Further, current GPS-based solutions provide only modest accuracy when a fine-grained distinction of e.g. transportation modes based on motion information is required.

Due to drawbacks of GPS-based systems some other solutions based on sensors for detecting motion of a device are developed. The solutions are typically based on a utilization of accelerometer sensors. By means of analyzing the sensor information conclusion on the motion may be derived at least to some accuracy. However, the problem with the accelerometer sensors is that they are affected by the earth's gravity and thus the measurement information comprises a source of error. In some state of the art implementations the earth's gravity component is taken into account opportunistically, when the device is determined to be stationary or use of the mean of the accelerometer measurement over a window. The former depends on frequent stationary periods, whereas the latter has poor accuracy with continuous acceleration. An alternatively technique is to use the L2 norm of accelerometer measurement. Even in that case the acceleration values of L2 norm are dominated by earth's gravity and thus effectively masking horizontal acceleration, which is important parameter e.g. in motorized transportation.

In some solutions a combination of the GPS-based system and accelerator sensor based system is developed, but the mentioned drawbacks remain, as the solutions are distinct to each other.

Worthwhile to mention is that in addition to earth's gravity also other acceleration related factors, such as a dynamic orientation of a device with respect to an entity in which the device is travelling, causes challenges. In other words, any so called external force in addition to effects originating from the motion of the device itself shall be taken into account in order to determine accurate computational results as regards to determination of the gravity component.

Thus, there is need to develop a solution in order to improve the accuracy of the measurement systems of prior art. Especially, it would be advantageous to sophistically determine a gravity component so that it takes into account a great amount of forces affecting the apparatus, i.e. the sensors, and utilize the estimated gravity information in any further need, such as in motion recognition of an apparatus.

SUMMARY

An objective of the invention is to present a method, an apparatus and a computer program product for determining an estimation of earth's gravity. Another objective of the invention is that the method, the apparatus and the computer program product for determining an estimation of earth's gravity takes into account changes in orientation of an object.

The objects of the invention are reached by a method, an apparatus and a computer program product as defined by the respective independent claims.

According to a first aspect, a method for generating an estimation of earth's gravity is provided wherein the method comprises: obtaining one or more acceleration data values and one or more orientation data values over a period of time; generating magnitude of orientation change from the orientation data values, determining a stability value based on the acceleration data values and the magnitude of orientation change generated from the orientation data values, the stability value indicating the stability during the period of time; comparing the determined stability value to a threshold value; and generating an estimation of earth's gravity over the period of time on the basis of the acceleration data values if the comparison indicates that the determined stability value is below the threshold value.

The stability value may be determined by summing up the following: standard deviation of the acceleration data values during the period of time, difference in mean of the acceleration data values during the period of time, magnitude of orientation change from the orientation data values during the period of time.

The estimation of earth's gravity may be generated by determining a mean of the acceleration data values during the period of time.

The estimation of earth's gravity between those two periods of time, whose determined stability values are below corresponding threshold values, may be generated by interpolating the acceleration values between the two periods of time.

The method may further comprise: comparing the estimation of the earth's gravity generated by interpolation with at least one estimation of earth's gravity generated through a comparison of the stability value to a threshold value in order to detect deviating estimations.

The threshold value may be adjusted in response to a determination that the stability value is below the threshold value over the period of time. The adjustment of the threshold value may be performed by increasing the threshold value by a predetermined factor. Alternatively or in addition, the adjustment of the threshold value may be performed by setting a previous stability value being below the threshold value to a new threshold value.

According to a second aspect, an apparatus for generating an estimation of earth's gravity, the apparatus comprising at least one processor; and at least one memory including computer program code is provided wherein the processor being configured to cause the apparatus at least to perform: obtain one or more acceleration data values and one or more orientation data values over a period of time; generate magnitude of orientation change from the orientation data values; determine a stability value for the apparatus based on the acceleration data values and the magnitude of orientation change generated from the orientation data values, the stability value indicating the stability during the period of time; compare the determined stability value to a threshold value; generate an estimation of earth's gravity over the period of time on the basis of the acceleration data values if the comparison indicates that the determined stability value of the apparatus is below the threshold value.

The apparatus may be configured to determine the stability value by summing up the following: standard deviation of the acceleration data values during the period of time, difference in mean of the acceleration data values during the period of time, magnitude of orientation change from the orientation data values during the period of time.

The apparatus may be configured to generate the estimation of earth's gravity by determining a mean of the acceleration data values during the period of time.

The apparatus may further be configured to generate the estimation of earth's gravity between those two periods of time, whose determined stability values are below corresponding threshold values, by interpolating the acceleration values between the two periods of time.

The apparatus may further be configured to: compare the estimation of the earth's gravity generated by interpolation with at least one estimation of earth's gravity generated through a comparison of the stability value to a threshold value in order to detect deviating estimations.

The apparatus may be configured to adjust the threshold value in response to a determination that the stability value is below the threshold value over the period of time. Further, the apparatus may be configured to perform the adjustment of the threshold value by increasing the threshold value by a predetermined factor. Alternatively or in addition, the apparatus may be configured to perform the adjustment of the threshold value by setting a previous stability value being below the threshold value to a new threshold value.

The apparatus may comprise at least one acceleration sensor and at least one gyroscope.

According to a third aspect, a computer program product is provided wherein the computer program product comprises portions of computer program code configured to perform at least part of the method as described above when at least some portion of the computer program code is executed in a computing device.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
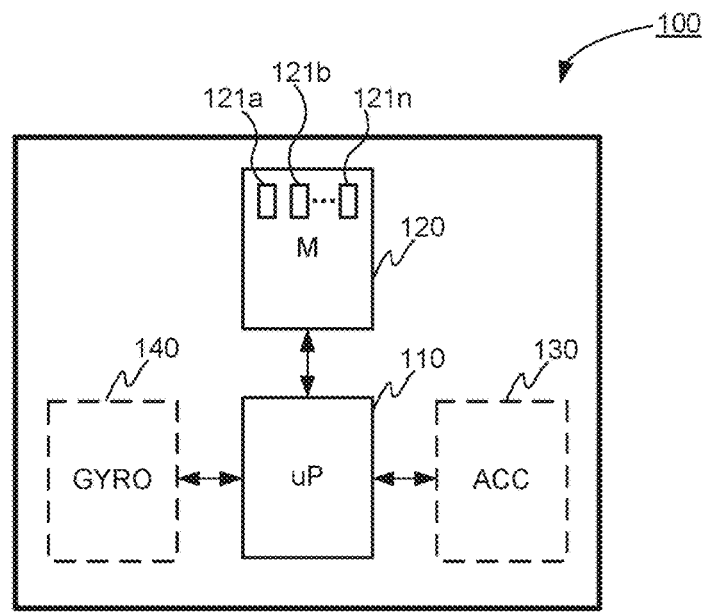
FIG. 1 illustrates schematically an example of an apparatus according to the invention.

FIG. 1 illustrates schematically, as an example, an apparatus 100 according to the invention. The apparatus 100 comprises one or more processors 110, one or more memories 120 being volatile or non-volatile for storing portions of computer program code 121a-121n. The apparatus may also comprise first and second sensors, wherein the first sensor is configured to measure acceleration 130 and the second sensor 140 is configured to measure orientation. The acceleration sensor 130, i.e. the first sensor, may be any applicable type of acceleration sensor suitable for measuring the acceleration in three spatial dimensions (3D). Alternatively, the measurement of acceleration may be arranged with more than one accelerators of 2D type. The orientation sensor 140, i.e. the second sensor, may e.g. be a gyroscope arranged in the apparatus 100. In FIG. 1 it is disclosed that the sensors are arranged in the apparatus, but it may also be arranged that the sensors are not physical parts of the apparatus, but may be communicatively coupled to the apparatus and coupled to an object, whose motion is configured to be monitored. The communication between the processor 110, the memory 120 and the sensors 130, 140 may internally be arranged e.g. through a data bus arranged in the apparatus 100.

The processor 110 of the apparatus 100 is configured to perform a method according to the present invention as will be described. Moreover, the processor 110 may be configured to control the operation of the apparatus 100. The controlling may be achieved by arranging the processor 110 to execute at least some portion of computer program code 121a-121n stored in the memory 120 causing the control operations by the processor 110. The processor 110 is thus arranged to access to the memory 120 and retrieve and store any information therefrom and thereto. Moreover, the processor 110 may be configured to control measurement operations of the sensors 130, 140 and obtain information from the sensors. The processor 110 may also be configured to control a storing of generated information. For sake of clarity, the processor herein refers to any unit suitable for processing information and control the operation of the apparatus, among other tasks. The mentioned operations may e.g. be implemented with a microcontroller solution with embedded software.

Depending on the type of the apparatus the apparatus may further comprise user interface for interacting with a user and a communication interface for communicating with any external entity. Naturally, any known way of providing necessary energy within the apparatus is applied, such as arranging a battery in the apparatus or providing the power from external source of energy. Further, an internal clock for providing a clock signal in the apparatus may be arranged in the apparatus 100, or it can be brought from an external source of clock signal.

Some non-limiting examples of an apparatus 100 as described may be mobile communication device, tablet computer, laptop computer, wrist-computer, a specific circuit connectable to other apparatus, devices or systems, and so on.

Figure 2:
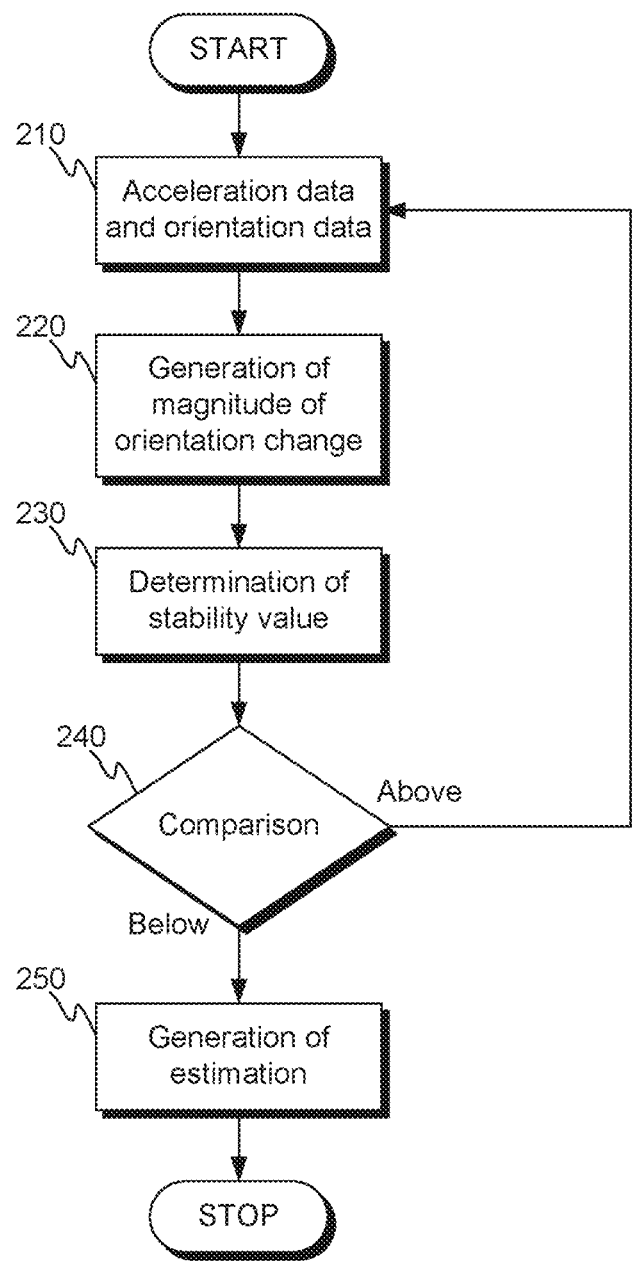
FIG. 2 illustrates schematically an example of a method according to the invention.

Next an example of a method according to the invention is described by referring to FIG. 2. In a first phase an apparatus as described is configured to obtain measurement values from sensors 210. The measurement values comprises at least acceleration data values from one or more accelerators and orientation data values from one or more gyroscopes. The measurement values may be obtained continuously or over certain period of time. However, an analysis for the obtained measurement data is performed to data values over a predetermined period of time. The obtained orientation data values are configured to be manipulated so that magnitude of orientation change is generated 220. The magnitude of orientation change herein refers to information which takes into account overall change in apparatus orientation on the basis of measurement information from gyroscope. The manipulation is advantageously performed to measurement data values obtained over the predetermined period of time at a time. The magnitude of orientation change over the predetermined period of time may e.g. be determined by first calculating a mean of the data values for orientation change and then taking a L2 norm from the mean value in order to determine the magnitude of orientation change for the period of time.

Figure 3:
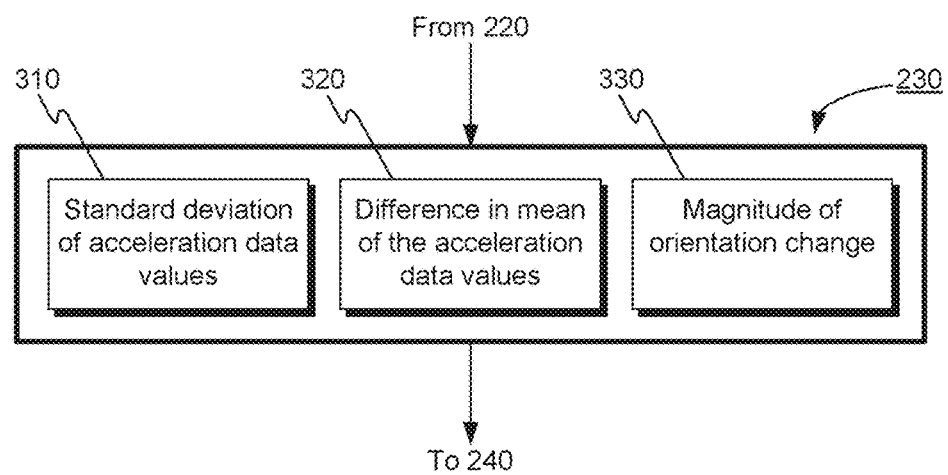
FIG. 3 illustrates schematically a method step in more detail.

In next phase a stability value is determined for the apparatus 230, whose motion is evaluated. By means on the stability value, which indicates the stability of the apparatus during the period of time in question, it is possible to determine a type of motion of the apparatus 100 in question is experiencing during the predetermined period of time. According to the present invention the stability value is derived from the obtained acceleration data values and magnitude of orientation change derived from the orientation data values. According to an embodiment of the invention, as depicted in FIG. 3, the stability value may be determined 230 by summing up at least the following: standard deviation of the acceleration data values during the period of time 310, difference in mean of the acceleration data values during the period of time 320, magnitude of orientation change from the orientation data values during the period of time 330. The one or more processors within the apparatus are advantageously configured to perform the determination of the stability value as described.

In some implementations of the invention the mentioned data values used in the determination of the stability value are configured to be weighted. An example of the weighting may be that the standard deviation of the acceleration data values receives a weight of 20%, the difference in mean of the acceleration data values receives a weight of 60% and the magnitude of orientation change from the orientation data values receives a weight of 20%. The weights may be adjusted e.g. according to a utilization area of the invention, for example. The weighting enables normalization of the mentioned values into the same scale.

The determination of the stability value 230 as described is advantageous due to a fact that it enables distinction between relevant acceleration information and acceleration noise information. In other words, the mentioned determination provide a tool for identifying two main sources of gravity estimation errors, namely turning periods when the accelerometer is affected by near constant centripetal force and sustained acceleration or braking periods when the accelerometer is affected by a constant horizontal acceleration. This is achieved by taking into account the magnitude of orientation change from the orientation data values obtained from a gyroscope in addition to derivatives from the acceleration data values.

Reverting back to FIG. 2 the determined stability value is configured to be compared to a threshold value 240. The threshold value may be experimentally determined and fixed. In some implementations the threshold value be determined based on the application area of the apparatus, e.g. if it is known that the apparatus is used in cars and motorcycles the threshold may be determined based on this background information. In some preferred implementations of the invention the threshold value is adjusted during the estimation of the gravity. According to a first embodiment the adjustment may be performed by modifying the existing threshold with a predetermined factor, such as with a percentage value. The adjustment may also be performed so that the predetermined factor is determined during the running time of the method, i.e. estimation of the earth's gravity, according to the invention. For example, it may be arranged so that the motion is monitored and the predetermined factor is defined according to monitored motion when at least one parameters relating to the motion is evaluated. Alternatively or in addition, the adjustment may be arranged so that the threshold value is initially set to some value, e.g. by giving the determined stability value determined from data values from the first period of time. As the next stability value is determined for the next period of time, the new stability value is compared to previous stability value, which is set as the threshold value. The adjustment may be continued as long as the apparatus is in motion, for example, or it is also possible to set some further criteria for the adjustment. By adjusting the threshold adaptively it is possible to meet at least some inertial noise factors originating e.g. from vehicle type, road and traffic conditions and user behavior. Thus, by adjusting the threshold it is possible to generate a high quality gravity estimate, as is and will be discussed herein.

The comparison step 340 is configured to be implemented so that if the determined stability value is above the threshold value it is concluded that the apparatus is not in such a motion, like in constant motion or stationary that estimation on gravity can be generated and the process is continued (see the arrow back to step 210). On the contrary, if the comparison indicates that the apparatus is in constant motion or stationary, or at least within limits thereto on the basis of the comparison, an estimation of earth's gravity may be generated 250.

The generation of the estimation of earth's gravity affecting the apparatus over the period of time is configured to be determined 250 on the basis of the acceleration data values if the comparison indicates that the determined stability value of the apparatus is below the threshold value. According to an embodiment of the invention the estimation of earth's gravity is generated by determining a mean of the acceleration data values during the same period of time for which the stability value is determined 230.

According to an embodiment of the invention the method comprises a step in which multiple comparison results are taken into account in the generation of the estimation for the earth's gravity. Namely, as already mentioned the determination of the stability value may be a continuous process and it is configured to be performed sequentially for a predetermined time window, i.e. period of time, such as 1 s. The comparison of the plurality of stability values determined for multiple periods of time may indicate that only some of the periods of time comprise such data values that are suitable for gravity estimation. In other words, during a total time the method is performed there may be multiple stability values, and thus periods of time, which fulfill the criteria set for the comparison. In such a situation it is possible to pick up the acceleration values, which belong to such time frames in which the stability value fulfills the criteria, and thus determining an estimate of gravity by e.g. taking a mean from the picked up acceleration values. Moreover, it is possible to determine an estimation of gravity also for such periods of time, whose stability value did not meet the criteria set for the comparison. Namely, the gravity estimate for such periods of time may be derived by interpolating an estimation of the gravity for such periods of time on the basis of estimated gravity values originating from such periods of time wherein the criteria set for the comparison, i.e. the stability value is below the threshold value, is met. In other words, the estimations of earth's gravity obtained from previous successful period of time and from the consequent successful period of time may, according to an embodiment of the invention, be used in the interpolation. In such a manner it is possible to generate the estimation of earth's gravity for the whole monitored time.

The interpolated estimation of gravity also provides a tool for detecting deviating estimations of gravity values from the whole set of estimations. Namely, as the interpolated estimation provides mathematically a value, whose reliability is higher than a reliability of one estimation derived through the method as depicted in FIG. 2, the interpolated estimation of earth's gravity may be used for detecting deviating gravity estimation values. For example, by simply comparing the interpolated value to each of the generated estimation values it is possible to improve the result e.g. by automatically ignore such estimation which deviate over a predetermined limit from the interpolated value. The advantage in detecting the deviating estimations is that in such a manner it is possible to remove those data values which originate from e.g. centripetal force the apparatus is experiencing.

The interpolation may e.g. be implemented so that starting from gyroscope values a new interpolation value is derived with a rotation matrix window by window. The term "window" refers herein a period of time. The interpolation value is limited with two heuristics: a) the change in gravitation values caused by the rotation cannot be larger than the real change in acceleration values during the window, and b) the new interpolation value is not allowed to increase a distance to previous interpolated value when compared to accelerator values. By using these two limitations it is possible to filter data values obtained from the gyroscope. The quality of interpolated gravity estimations may e.g. be evaluated by mutually comparing the interpolated values, when the interpolation is initiated from gravity estimations defined to both ends of the window, which is interpolated. The interpolation in this manner enables utilization of basic sensors and it takes into account a noisy/dynamic environment in which the gravity estimates are determined.

It is worthwhile to mention that the period of time, i.e. time window, over which the stability value is determined may be adjusted for a need. For example, the time window may be adjusted according to an expected accelerometer pattern so that if it is expected that there will be sharp turns and maneuvers in the monitored motion, a shorter time window may be set, and if long moving modalities are expected, a longer time window may be set. Additionally, the sampling rate of data values obtained from the sensors may be adjusted, which provide more or less data values for the data window. This may be also arranged in the similar manner as the adjustment of time window.

As already referred the generated gravity estimate may be utilized for determination of motion information of the apparatus. More specifically, it enables a more sophisticated estimation of linear acceleration, and thus e.g. improved determination of transport mode. The generated gravity estimate may be used for eliminating acceleration component caused by earth's gravity from the data values from accelerometer and then, by projecting the gravity eliminated accelerometer measurements onto horizontal plane to obtain an estimate of the overall linear acceleration. The linear acceleration, in turn, is an important enabler for many applications of mobile and wearable activity recognition as it allows separating movement along horizontal and vertical planes and helps to overcome sensitivity to apparatus orientation. Thus, as the gravity estimation is of high quality it is possible to derive more sophisticated linear acceleration values, which may be used for multiple purposes, such as for determination of transportation mode. In addition to the determination of the transportation mode the method and apparatus as described may be utilized, but is not limited to, in evaluation of one's driving style, evaluation of fuel consumption, inertial navigation, evaluating of road condition as well as evaluation of traffic situation in general. Broadly speaking the generation of the estimation for earth's gravity may be applied in any evaluation of motion of an object into which the mentioned sensors are coupled to and the measurement data is obtained.

The present invention introduces a novel and inventive method for estimating the earth's gravity by taking into account the acceleration data and orientation data. The advantage of taking the orientation data into account in the manner as described is that impact of any centripetal force may be mitigated in the estimation, among other things. This, in turn, provides improved estimations and an accuracy of any device or system utilizing the estimated earth's gravity may be improved in any application area. Even if it is herein mainly described that the invention relates to an estimation of earth's gravity affecting to an apparatus. Being more specific, the estimation is determined for an object into which the sensors are coupled to. In some implementations of the invention the sensors reside within the apparatus, but this is not a prerequisite of the invention as such.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method for generating estimations of earth's gravity for sequential periods of time for use in measuring motion of an object, the method comprising for each period of time:
    obtaining from an acceleration sensor one or more acceleration data values,
    obtaining from a gyroscope one or more orientation data values over a period of time in question,
    generating in a processor magnitude of orientation change from the orientation data values,
    determining in a processor a stability value based on the acceleration data values and the magnitude of orientation change generated from the orientation data values, the stability value indicating the stability during the period of time in question,
    comparing in a processor the determined stability value to a threshold value wherein the threshold value is adjusted for the period of time in question,
    generating in a processor an estimation of earth's gravity over the period of time in question on the basis of the acceleration data values if the comparison indicates that the determined stability value is below the threshold value, thereby mitigating at least an impact of any present centripetal force;

wherein the estimation of the earth's gravity relates to an object to which the acceleration sensor and the gyroscope are coupled.

2. The method of claim 1, wherein the stability value is determined by summing up the following: standard deviation of the acceleration data values during the period of time in question, difference in mean of the acceleration data values during the period of time in question, magnitude of orientation change determined from the orientation data values during the period of time in question.

3. A non-transitory computer-readable medium on which is stored a program which, when executed by a computer, causes the computer to perform the method of claim 2.

4. The method of claim 1, wherein the estimation of earth's gravity is generated by determining a mean of the acceleration data values during the period of time in question.

5. A non-transitory computer-readable medium on which is stored a program which, when executed by a computer, causes the computer to perform the method of claim 4.

6. The method of claim 1, wherein the estimation of earth's gravity between two periods of time, whose determined stability values are below corresponding threshold values, is generated by interpolating the acceleration values between the two periods of time.

7. The method of claim 6, wherein the method further comprising: comparing the estimation of the earth's gravity generated by interpolation with at least one estimation of earth's gravity generated through a comparison of the stability value to a threshold value in order to detect deviating estimations.

8. The method of claim 1, wherein the threshold value is adjusted in response to a determination that the stability value is below the threshold value over the period of time in question.

9. The method of claim 8, wherein adjustment of the threshold value is performed by increasing the threshold value by a predetermined factor.

10. The method of claim 8, wherein the adjustment of the threshold value is performed by setting a previous stability value being below the threshold value to a new threshold value.

11. A non-transitory computer-readable medium on which is stored a program which, when executed by a computer, causes the computer to perform the method of claim 1.

12. An apparatus for generating estimations of earth's gravity for sequential periods of time for use in measuring motion of an object, the apparatus comprising
    at least one processor;
    at least one acceleration sensor;
    at least one gyroscope; and
    at least one memory including computer program code characterized in that the processor being configured to cause the apparatus at least to perform for each period of time:
        obtain one or more acceleration data values from the at least one acceleration sensor and obtain one or more orientation data values from the at least one gyroscope over a period of time in question,
        generate magnitude of orientation change from the orientation data values,
        determine a stability value for the apparatus based on the acceleration data values and the magnitude of orientation change generated from the orientation data values, the stability value indicating the stability during the period of time in question,
        compare the determined stability value to a threshold value wherein the threshold value is adjusted for the period of time in question,
        generate an estimation of earth's gravity over the period of time in question on the basis of the acceleration data values if the comparison indicates that the determined stability value of the apparatus is below the threshold value, thereby mitigating at least an impact of any present centripetal force;
        wherein the estimation of the earth's gravity relates to an object to which the acceleration sensor and the gyroscope are coupled.

13. The apparatus of claim 12, wherein the apparatus is configured to determine the stability value by summing up the following: standard deviation of the acceleration data values during the period of time in question, difference in mean of the acceleration data values during the period of time in question, magnitude of orientation change determined from the orientation data values during the period of time in question.

14. The apparatus of claim 12, wherein the apparatus is configured to generate the estimation of earth's gravity by determining a mean of the acceleration data values during the period of time in question.

15. The apparatus of claim 12, wherein the apparatus is configured to generate the estimation of earth's gravity between two periods of time, whose determined stability values are below corresponding threshold values, by interpolating the acceleration values between the two periods of time.

16. The apparatus of claim 15, wherein the apparatus is further configured to: compare the estimation of the earth's gravity generated by interpolation with at least one estimation of earth's gravity generated through a comparison of the stability value to a threshold value in order to detect deviating estimations.

17. The apparatus of claim 12, wherein the apparatus is configured to adjust the threshold value in response to a determination that the stability value is below the threshold value over the period of time in question.

18. The apparatus of claim 17, wherein the apparatus is configured to perform the adjustment of the threshold value by increasing the threshold value by a predetermined factor.

19. The apparatus of claim 17, wherein the apparatus is configured to perform the adjustment of the threshold value by setting a previous stability value being below the threshold value to a new threshold value.

* * * * *